Oct. 13, 1936.  L. J. R. HOLST ET AL  2,056,966
CONTINUOUSLY MOVING FILM CAMERA
Filed Nov. 9, 1932
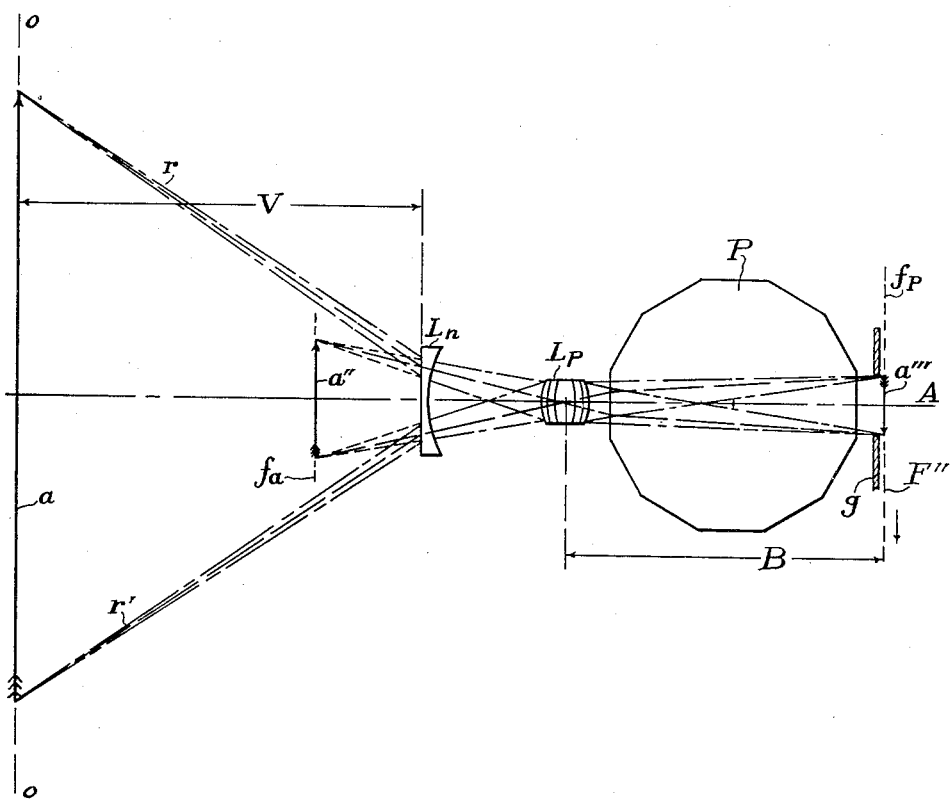
Inventor
LODEWYK J. R. HOLST
WILLIAM MAYER AND
HARRY R. MENEFEE
By 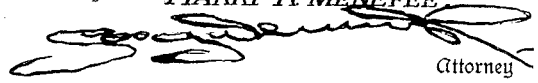
Attorney Patented Oct. 13, 1936

2,056,966

UNITED STATES PATENT OFFICE 2,056,966

CONTINUOUSLY MOVING FILM CAMERA

Lodewyk J. R. Holst, Brookline, Pa., William Mayer, Larchmont, and Harry Ray Menefee, Bronxville, N. Y., assignors to The S. M. M. H. Corporation, Dover, Del., a corporation of Delaware Application November 9, 1932, Serial No. 641,816

1 Claim. (Cl. 88—16.8)

Our invention is designed to provide a continuously moving film camera in which a real image of small area may be formed on a continuously moving film from physical objects within an area of view much greater than the normal area of view from a given viewpoint of the lens of positive focus forming the real image when used alone for producing images of physical objects within the same object plane; the plane of the real image made in accordance with our improvements lying at an equal or greater distance from the focal center of the positive lens than the image plane conjugate with such physical object plane of the lens when used alone and the rays forming the image point being displaced to compensate for the film movement, by the rotation of a transparent block having a plurality of pairs of parallel surfaces. Our improvements further greatly increase the depth of the field of view within which objects at different distances remain in sharp focus and produce sharp images even when the foreground objects are very close.

In accordance with our invention, the real image in the image plane of the positive lens is formed by focusing thereon image rays from a virtual image in a plane conjugate with the physical object plane, so that the actual image is formed from a virtual image of larger area than the actual image instead of being formed directly from physical objects within the object plane conjugate with the real image plane. The real image plane is coincident with a light sensitive surface upon which the focused image points form an image.

Our invention involves the positioning of a lens of negative focal length, preferably achromatized in the known manner, in the object space of a positive lens at such distance therefrom that a virtual image plane of the negative lens is coincident with a front focal plane of the positive lens conjugate with the posterior focal plane of the positive lens coincident with the plane of the sensitized surface and the rays forming the image points in such posterior focal plane are rectified or bent to compensate for the movement of the sensitized surface.

The focal length of the negative lens alone is preferably longer than, and should be at least equal to, the focal length of the positive lens alone, so that the virtual image formed by the negative lens is larger than the real image which would be formed by the positive lens alone. But such larger image is reduced, for instance, to the size of the normal image produced by the positive element when used by itself, by suitably adjusting the position of the lenses relatively to one another and the rectifier and to the plane of the sensitized surface. By forming a real image from a virtual image in accordance with our improvements, ample space is provided for a rectifier of suitable size to effect the desired ray displacement since the focal distance between the plane of the sensitized surface and the positive lens is substantially increased, as compared with the focal distance at which the positive lens alone would produce an image of equivalent size of a much smaller field of view, the angle of view and the evenness of light distribution in the real image made in accordance with our invention are greatly increased, and the distortion of the image is greatly decreased.

The characteristic features and advantages of our improvements will further appear from the following description and the accompanying drawing illustrating diagrammatically the principles of our invention.

The drawing illustrates diagrammatically an arrangement of lenses, light-ray deflecting block, and sensitized surface, and the course of light rays from a physical object plane to such sensitized surface in accordance with our invention when applied to a motion picture camera having a continuously moving film, such, for instance, as described in the application of L. J. R. Holst, Serial No. 452,871, filed May 16, 1930.

As illustrated diagrammatically in the drawing, a negative lens $Ln$, mounted in a suitable camera box, not shown, has its receiving surface positioned at a distance V from an object plane O—O, and collects image rays from image points of all objects within the field of view represented by the arrow $a$. The bundles of image rays from the image points, indicated by broken lines $r$, $r'$, and collected by the negative lens $Ln$, form an erect and reduced virtual image $a''$ in the negative focal plane $fa$ of the negative lens $Ln$.

A lens $Lp$ has a positive focal length which is preferably less than the focal length of the lens $Ln$ and may consequently be of smaller diameter than the lens $Ln$. The lens $Lp$ is positioned in axial coincidence with the lens $Ln$ in the camera axis A—A, and the lenses are so spaced that the anterior focal plane of the lens $Lp$, conjugate with the real image plane thereof, is substantially coincident with the virtual image plane $fa$ of the lens $Ln$, so that the virtual image $a''$ may be considered the object of the lens $Lp$. This results in the formation of a real image $a'''$ in the posterior focal plane $fp$ of the lens $Lp$, such real image $a'''$ being smaller than the virtual image $a''$ in proportion to the distance of the conjugate focal planes $fa$ and $fp$ from the optical center $c$ of the lens $Lp$. By suitably positioning the lenses $Lp$ and $Ln$, any desired ratio between the images $a''$ and $a'''$ can be effected.

The courses of the image rays from points in the physical object plane O—O within the limits indicated by arrow $a$ to complementary virtual image points in the plane $fa$, and thence from such virtual image points (now acting as object points) to complementary real image points in the plane $fp$ are indicated by the lines connecting such points, the axial ray of each light bundle being indicated by dash lines and the outlines of the respective bundles being indicated by the dot and dash lines.

If a negative lens $Ln$ of say 6" focal length be used with a positive lens $Lp$ of say 3" focal length, the negative lens may be made of such diameter as to collect rays from the entire area $a$ without substantially impairing the intensity of or distorting the rays forming the marginal portions of the virtual image $a''$; and the virtual image will be twice the size of an image which would be formed from the same viewpoint directly from the physical objects in the plane O—O by the lens $Lp$ in the absence of the lens $Ln$.

To produce from the virtual image $a''$ a real image $a'''$ of half the size of the virtual image, the lens $Lp$ should be placed one and one-half times its equivalent or principal focal length from the image plane $fp$, and the virtual image plane of the negative lens $Ln$ (which coincides with the front conjugate focal distance of the lens $Lp$) should be three times its principal focal length from the lens $Lp$.

In the example given, the distance between the positive lens and the negative lens will be $3 \times 3'' - 6''$ or 3", plus the slight increase of the distance between the negative lens and its virtual image plane over the actual length of its negative focus. Such additional distance is dependent on the distance between the negative lens and the physical objects in the plane O—O from which the virtual image $a''$ is generated, and is readily determinable by adjustment and observation.

It is, therefore, rendered practicable to place within the limits of a gate aperture an image of twice the angular extent of an image placed within such aperture when made by the positive lens $Lp$ alone from the same viewpoint; thereby securing the effect of a wide angle lens without the disadvantageous characteristics thereof and while increasing, instead of decreasing, the physical distance between the lens $Lp$ and the image plane $fp$.

In accordance with our invention, the use of a lens having a positive focal length longer than the minimum heretofore is rendered possible, giving acceptable results and yet embracing a larger image angle than heretofore attainable. For instance, by using a positive lens $Lp$ of 40 mm. or about 1.575" focus and a negative lens of 3.5" focus, we produce a virtual image 2.22 times larger than the size of the image produced by the lens of 1.575" focus alone. To reduce this virtual image to a real image .8" x .6", the positive lens $Lp$ is placed 2.284" from the image surface $fp$, and will include thereon an actual image angle having a tangent $$\left(2.222 \times \frac{.4}{1.575}\right)$$

2 or 63 degrees 20 minutes on the long or .8" side.

The drawing shows diagrammatically the application of our lens system to a motion picture camera having a film band carried by suitable reels and fed uninterruptedly downward at a constant speed past an aperture in the gate $g$. In such cameras, the film images $a'''$ are constantly displaced by means of a transparent glass block rotating clockwise and having the form of a regular even sided polygon to prevent relative motion between the film strip and the images being impressed thereon. The facets of the polygon should be as high as the gate aperture, and a twelve sided polygon is preferably used. To provide for the insertion of this polygon and sufficient clearance between it and the film and between it and the positive lens forming a real image in the plane of the film necessitates a considerable distance between the positive lens and film plane. By our improvements, which increase the distance between the positive lens and film plane, it is rendered practicable to use in such cameras lenses otherwise unavailable therefor.

In cameras adapted for use with standard 35 mm. film with standard perforations at the pitch of .187" between holes and four holes to each image unit, the images impressed upon the film are each .748" high in the direction of the length of the film strip.

When using therein a twelve sided polygon P made of glass having an index of refraction of about 1.5102 for the $d$ line of the spectrum, the opposite parallel facets of the block P should be about 4" apart, so that the measurement over the edges is about 4.109". When such a glass block is turned on its axis through one-twelfth of a revolution, it displaces light rays passing through it a distance of .748" together parallel to themselves. If the aperture in the gate $g$ is .748" high, succeeding image units impressed on the film strip will also be .748" high if the film is moved across the gate aperture at the rate of $12 \times .748''$ for each complete turn of the glass block and in the direction of movement of the facet adjacent the film, as indicated by the arrows.

It is preferable that the image rays traversing the block P should converge toward the images to be produced upon the film, hence the block P may advantageously, though not necessarily, be placed in the posterior focal distance of the lens $Lp$. If, for mechanical reasons, a distance of .75" be allowed between the rear nodal point of the positive lens and the adjacent edge of the glass block P, and a similar distance allowed between the opposite side edge of the block and the focal plane $fp$ in which the film band F" travels, the back focal distance of the positive lens is 5.609". There may, however, be deducted therefrom a distance equal to $$\frac{(n_d - 1)}{r_d} t$$

in which $n_d$ is the refractive index, (assumed at 1.5102) and $t$ is the thickness of the parallel glass plate formed by each pair of parallel facets, i. e. 4". This deduction amounts to 1.351" so that the actual posterior focal distance should be 4.258". If the positive lens is to be adjusted to produce a film image in the plane $fp$ half the size of the virtual image in the plane $fa$, then 4.258" must equal one and a half times the principal focal length of the lens to be used, in this instance $$\frac{4.258}{1.5}$$

or 2.838″ as a minimum. Hence a positive lens of 3″ equivalent focus will apply with perfect satisfaction to this type of camera. The front focal distance must be 3×3″ or 9″, so that the use of a negative lens $L_n$ of 6″ focus is feasible and the distance between the lenses is such that the block P may, if desired, be interposed between them instead of between the lenses $L_p$ and the gate $g$.

It may be noted that the thick plate effect, amounting in this instance to 1.351″, is not an increase of the actual rear focal length, but represents merely a shift of the image parallel to itself by this amount.

Having described our invention we claim:—

Photographic apparatus comprising a lens of positive focal length, a lens of negative focal length, a rotatable transparent block having a plurality of pairs of parallel surfaces, and means for supporting a light sensitive surface in a focal plane of said positive lens and in the path of light rays passing through said lenses and block.

LODEWYK J. R. HOLST.
WILLIAM MAYER.
HARRY R. MENEFEE.